US008881614B2

(12) United States Patent
Becke et al.

(10) Patent No.: US 8,881,614 B2
(45) Date of Patent: Nov. 11, 2014

(54) VEHICLE TRANSMISSIONS

(75) Inventors: Martin Becke, Ulm (DE); Werner Klement, Heidenheim (DE); Dieter Nobis, Neu-Ulm (DE)

(73) Assignee: Voith Patent GmbH, Heidenheim (DE)

( * ) Notice: Subject to any disclaimer, the term of this patent is extended or adjusted under 35 U.S.C. 154(b) by 196 days.

(21) Appl. No.: 13/540,953

(22) Filed: Jul. 3, 2012

(65) Prior Publication Data

US 2013/0036848 A1    Feb. 14, 2013

(30) Foreign Application Priority Data

Jul. 4, 2011    (DE) .......................... 10 2011 106 443

(51) Int. Cl.
*F16H 37/06*    (2006.01)
*F16H 37/04*    (2006.01)
*B60K 6/48*    (2007.10)
*B60W 10/111*    (2012.01)
*B60W 30/19*    (2012.01)
*B60W 20/00*    (2006.01)
*B60K 6/547*    (2007.10)

(52) U.S. Cl.
CPC ............... *B60K 6/48* (2013.01); *F16H 37/046* (2013.01); *B60K 2006/4816* (2013.01); *Y02T 10/6256* (2013.01); *B60W 10/111* (2013.01); *B60W 30/19* (2013.01); *Y02T 10/6221* (2013.01); *B60W 20/00* (2013.01); *B60K 6/547* (2013.01)
USPC .............................................. 74/325; 74/661

(58) Field of Classification Search
USPC .................................. 74/325, 333, 661, 665 R
See application file for complete search history.

(56) References Cited

U.S. PATENT DOCUMENTS

| 6,560,521 | B1 * | 5/2003 | Sakamoto et al. | ............... 701/51 |
| 7,462,121 | B2 * | 12/2008 | Janson et al. | ..................... 475/5 |
| 8,066,617 | B2 * | 11/2011 | Steinborn et al. | ............... 477/15 |
| 8,262,538 | B2 * | 9/2012 | Borntraeger | ..................... 477/5 |

FOREIGN PATENT DOCUMENTS

| DE | 103 15 683 | 10/2004 |
| DE | 10 2004 055 821 | 5/2006 |
| DE | 10 2009 000 710 | 8/2010 |
| DE | 10 2009 001 146 | 8/2010 |
| DE | 10 2010 030 576 | 12/2011 |

OTHER PUBLICATIONS

European Office Action dated Sep. 10, 2012 for European Application No. 10 2011 106 443.9.

* cited by examiner

*Primary Examiner* — Ha D Ho
(74) *Attorney, Agent, or Firm* — Farjami & Farjami LLP

(57) ABSTRACT

A vehicle transmission includes a transmission input and output along with a main shaft and a countershaft that create a plurality of transmission ratios for providing different gears when combined. The vehicle transmission also includes a range change transmission. The vehicle transmission also has, in the direction of the propulsion power flow from the transmission input to the transmission output, a performance interface downstream of the countershaft and upstream of the range change transmission for connecting an electric motor.

14 Claims, 2 Drawing Sheets

VEHICLE TRANSMISSIONS

This is a U.S. application which is based on, and claims priority from foreign application Serial No. 10 2011 106 443.9, filed Jul. 4, 2011, in Germany.

The present invention relates to a vehicle transmission which is constructed as a variable speed transmission in order to produce different transmission ratios by means of multiple different transmission ratios, generally in the form of gear sets, normally referred to as gears, between a transmission input and a transmission output. The invention furthermore relates to a method for controlling such vehicle transmission.

With respect to the gearshift of the various gears, different versions can be considered, such as manual transmissions, automated manual transmissions, twin-clutch transmissions, or automated transmissions, also referred to as automatic transmissions; the latter in the form of a converter transmission or automatic transmission, for example, with a hydrodynamic clutch as starting element.

Generic vehicle transmissions have been known for many decades and were continuously developed and refined with respect to the number of available gears and ease of gearshift, for example, to optimize the power transfer between the combustion engine integrated on the transmission input and the drive wheels of the vehicle that are normally connected to the transmission output by means of a propshaft, both in view of the efficiency as well as also in terms of the vehicle driving characteristics. More recently, increased efforts were made furthermore to integrate an electric motor into the vehicle transmission to demonstrate a so-called hybrid drive, or with respect to the propulsion power flow from the combustion engine to the drive wheels integrate the electric motor into the vehicle drivetrain ahead of the transmission or downstream of the transmission. DE 10 2004 055 821 A1 and DE 10 2009 001 146 A1 disclose small electric motors that are connected in the transmission or outside of it, which are used as an electrodynamic brake, but also permit generative operation.

The integration of such electric motor within the transmission requires extensive structural changes of the transmission so far, which is problematic in terms of the necessary installation space as well as production costs. This means that traditional transmission assemblies, i.e. the form of traditional transmissions without an integrated electric motor, will be completely abandoned as a rule and a new transmission be built around the electric motor. This is unfavorable since the structural designs, which have proven themselves across decades, can no longer be used. Although versions in which the electric motors are located outside of the transmission make it possible to utilize traditional transmission design structures, these are restricted in terms of the electric motor functionality and the available installation space, however.

SUMMARY

The object of the present invention is to indicate a vehicle transmission which essentially retains the proven transmission structure and facilitates a particularly skillful integration of an electric motor into the vehicle transmission. In this context, the electric motor must particularly also be able to be operated as a wear-free brake, and it would be particularly advantageous to be offered as part of a brake package with a hydrodynamic retarder to increase the maximum braking torque. Furthermore, a particularly advantageous method for controlling a vehicle transmission as taught by the invention should be indicated.

The invention teaches that this object is solved by a vehicle transmission with the features taught by the present inventive concepts.

The vehicle transmission as taught by the invention comprises a transmission input as well as a transmission output. Furthermore a main shaft and a so-called countershaft are provided which together constitute a multitude of transmission ratios for the provision of different gears. Generally, the countershaft is parallel to the main shaft, and is provided enclosed by the common transmission case, for example.

The countershaft can be shifted by means of at least one or two parallel gear ratios that are optionally shiftable in drive connection with the transmission input, and the main shaft can be shifted by means of a range change transmission, comprising at least two reciprocally different range-change unit transmissions, optionally shiftable in a drive connection with the transmission output. The transmission input and the transmission output are formed respectively by one shaft each, for example, wherein the two shafts, the transmission input shaft and the transmission output shaft, are positioned in particular reciprocally coaxial and advantageously also coaxial to the main shaft.

The invention teaches that a performance interface for connecting an electric motor is now provided with respect to the power flow from the transmission input to the transmission output downstream of the countershaft and ahead of the range change transmission. The connection of the electric motor as taught by the invention has numerous advantages. Such as that by means of the electric motor, the torque exerted on the transmission output can be variably superelevated by the range change transmission. If the range change transmission has a first range change unit transmission ratio of 1 and a second range change unit transmission ratio of larger than 3, for example, particularly of 4, then in a first shifting status of the range change transmission, the torque of the electric motor can be transmitted 1:1 to the transmission output, whereas in a second shifting status of the range change transmission it is superelevated by the factor of the second range change unit transmission ratio by the factor of 4, for example. As a result, it is possible to use a comparatively smaller electric motor, which will always provide the necessary torque, however.

Furthermore, by the integration of the electric motor it is advantageous that during each gear change, which is obtained by means of a change of the transmission ratio between the main shaft and the countershaft, normally by optional shifting of the multiplicity of gear sets, a shift without interruption of the tractive force can be provided and power-shift like behavior of the vehicle transmission is achieved especially in the lower gears. Pursuant to an embodiment of the invention, every time when during a gear shift an interruption in tractive force between the transmission input and the performance interface in the area of the vehicle transmission and/or an interruption of the propulsion power flow in the direction of the transmission output and/or during an interruption in tractive force due to other causes occurs, the electric motor can be power operated and feed impulsive power via the performance interface into the drivetrain and use it to drive the transmission output, in particular with the same propulsive power which existed there prior to the interruption of the tractive power and/or the propulsive power transmission, advantageously with a following change of the propulsive power that was made available, which is matched to that after the gearshift.

Such powershift-like behavior can be accomplished with the vehicle transmission as taught by the invention, without that the vehicle transmission and/or the shifting range of the vehicle transmission within which the different gears are provided must be designed as a traditional dual clutch transmission.

The same interface which is used for integrating the electric motor can be used advantageously at the same time for integrating a hydrodynamic retarder. As a result, the same contingency of the variable transmission ratio between the rotor of the retarder and the transmission output is provided for the hydrodynamic retarder, with a corresponding option of torque superelevation. The performance interface can be formed by a gear wheel, for example, which can be shifted into a drive connection with the main shaft or the countershaft. The gear wheel can be supported by the main shaft or by the countershaft, for example, and its axis of rotation can coincide with the axis of rotation of the main shaft or of the countershaft. The gear wheel can then advantageously mesh with a pinion, presently referred to as first pinion, which drives the electric motor when this is operated generatively, and/or is driven by the electric motor when the electric motor is power operated, and/or which is driven by the electric motor when the electric motor is power operated in order to drive the transmission output via the range change transmission. The first pinion can be positioned on the rotor of the electric motor, for example, and can in particular be supported by it.

When providing a hydrodynamic retarder, this can be driven via a second pinion that in particular is supported by the rotor of the hydrodynamic retarder, wherein the second pinion also meshes with the gear wheel forming the performance interface.

The electric motor and/or the hydrodynamic retarder/s can be positioned inside the transmission housing or be supported outside on the transmission housing. Another positioning, remote from the transmission housing, is obviously also conceivable.

The gear wheel forming the performance interface is advantageously shiftable by means of a selector sleeve in a drive connection with the main shaft or the countershaft. If the gear wheel is supported by the main shaft, for example, then it is favorable that the selector sleeve is also supported by the main shaft and that it can be shifted in an axial direction for example between a first position, in which the selector sleeve is in a mechanical drive connection with the gear wheel, and a second position, in which this mechanical drive connection to the gear wheel is interrupted.

It is particularly favorable, if the selector sleeve can be shifted not only optionally into a drive connection with the gear wheel which is forming the performance interface, but also be used for optionally forming one of the several transmission ratios between the main shaft and the countershaft, such as for developing a reverse gear Traditionally, such selector sleeve is already provided as the last selector sleeve as a rule seen from the transmission input to the transmission output, in order to develop the reverse gear. This selector sleeve can now be used in a second shifting status without any major structural changes of the vehicle transmission for the purpose to linkup the electric motor and/or the hydrodynamic retarder to the main shaft or the countershaft. Pursuant to an embodiment, the selector sleeve has a third shift position, in which the drive connection via the selector sleeve is interrupted, so that neither the reverse gear is engaged nor the electric motor and/or the hydrodynamic retarder is linked-up.

A friction clutch, a hydrodynamic converter and/or a hydrodynamic clutch can be provided as a starting element on the transmission input side, either in the drive connection between the transmission input and the countershaft or respectively before the transmission input.

BRIEF DESCRIPTION OF THE DRAWING

In the following, the invention is to be further explained by means of two embodiments as examples;
As follows.

DETAILED DESCRIPTION

Figure 1:
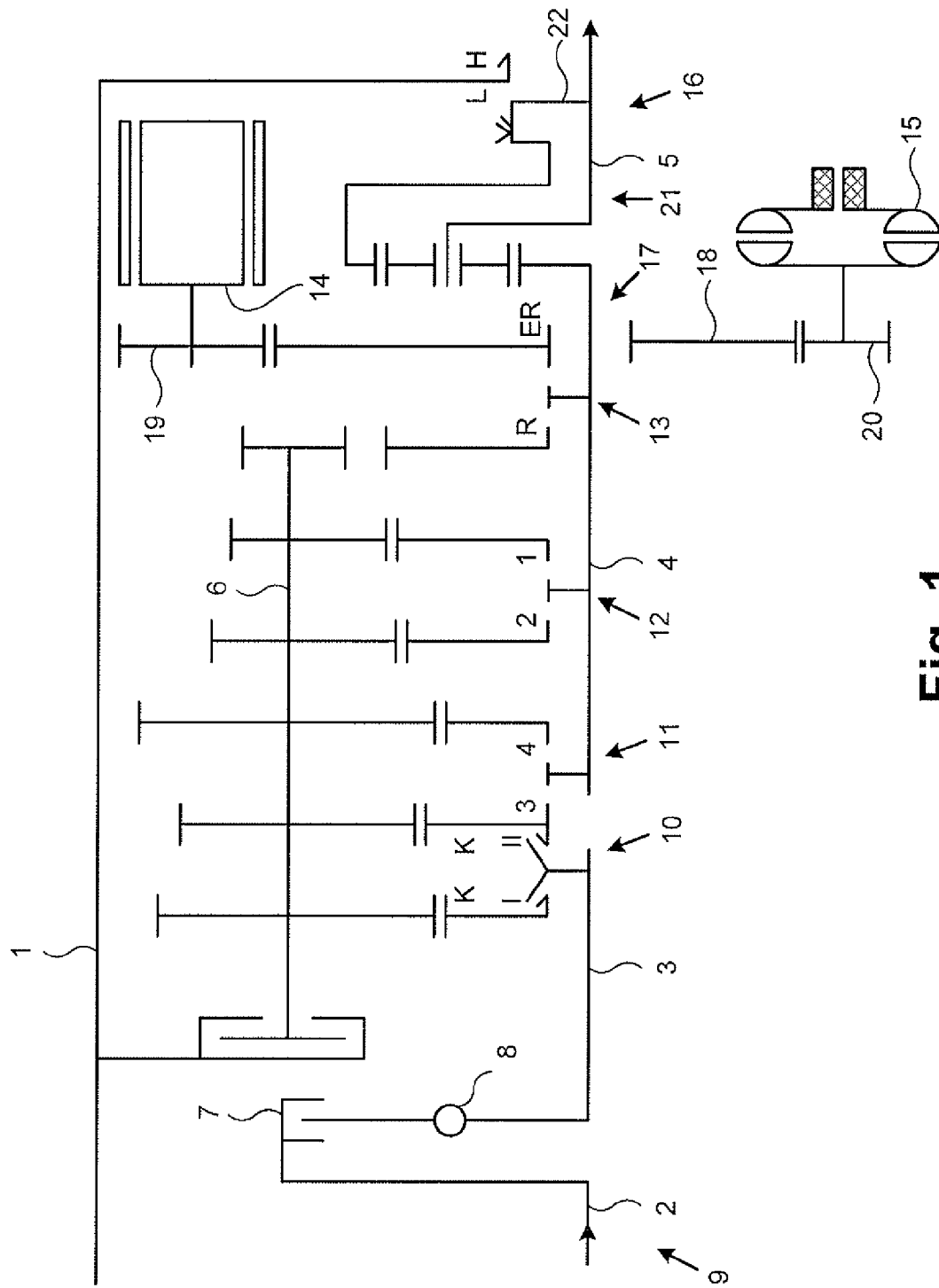
FIG. 1 is a first embodiment of integrating the electric motor as taught by the invention upstream of the range change transmission with an additionally integrated hydrodynamic retarder.

FIG. 1 schematically illustrates a vehicle transmission as taught by the invention with a transmission housing 1, which includes a transmission input shaft 2, an intermediate shaft 3, a main shaft 4, a transmission output shaft 5, and a countershaft 6.

The transmission input shaft 2 can be shifted into a drive connection with the intermediate shaft 3 via a friction clutch 7 and a torsional damper 8 by closing the friction clutch 7. If the transmission is designed as an automated transmission or automatic transmission, then in the area of the transmission input 9, which is formed here by the transmission input shaft 2, also a starting element in the form of a hydrodynamic clutch or a hydrodynamic converter can be provided.

The intermediate shaft 3 can be shifted with the countershaft 6 by means of a first selector sleeve 10 optionally into one of two different transmission ratios that are different from one another, formed by corresponding gear sets. These two transmission ratios which can be selected optionally by the first selector sleeve 10, form a so-called primary transmission.

The propulsive power transmitted via the primary transmission to the countershaft 6 can then be transmitted to the main shaft 4 either by corresponding shifting of the second selector sleeve 11 into one of two provided transmission ratios or of the third selector sleeve 12 in turn into one of two provided transmission ratios. Alternatively or in addition to locking the transmission, the propulsive power can be transmitted from the countershaft 6 to the main shaft 4 by the fourth selector sleeve 13 for developing a reverse gear.

The reverse gear, as is known, is characterized in that the direction of rotation on the transmission input 9 and/or on the transmission input shaft 2 is opposite to the one on the transmission output 16 and/or on the transmission output shaft 5.

The invention teaches that now the traditionally used fourth selector sleeve 13 is used only on one side for producing or interrupting the reverse gear, to optionally integrate the electric motor 14. In the embodiment shown, the hydrodynamic retarder 15 is also always coupled-up with or uncoupled from the main shaft 4 together with the electric motor 14 by corresponding shifting of the fourth selector sleeve 13. The configuration of a hydrodynamic retarder 5 with a revolving rotor and a stationary stator or a second rotor revolving in the opposite direction, which together with the rotor forms a working space that is filled or can be filled with a working medium to transfer the propulsive power hydrodynamically from the rotor to the counter-rotating rotor and/or to the stator, is known and must therefore not be further detailed here.

The fourth selector sleeve 13, as can be seen, is the last selector sleeve before the range change transmission 21, viewed in direction of the propulsion power flow from the transmission input 9 to the transmission output 16, wherein the performance interface 17 for connecting the electric motor 14 and the hydrodynamic retarder 15, here formed by the gear wheel 18 which meshes with a first pinion 19 of the electric motor 14 and a second pinion 20 of the hydrodynamic retarder 15, is positioned in direction of the propulsion power flow from the transmission input 9 to the transmission output 16 behind the countershaft 6.

For example, however not mandatory, the transmission ratio between the electric motor 14 and the performance interface 17 is designed deviating from the transmission between the hydrodynamic retarder 15 and the performance interface 17, for example, as shown here by an example, in that the second pinion 20 has another diameter, in particular smaller diameter for producing a comparatively larger transmission ratio, than the first pinion 19.

The main shaft 4 is in driving connection with the transmission output shaft 5 via the range change transmission 21, wherein the range change transmission 21 in the embodiment shown is designed in the form of a planetary transmission, the planet carrier of which can be supported by means of a further selector sleeve 22 of the range change transmission 21 optionally in a drive connection with the internal ring gear or stationary on the transmission housing 1.

Figure 2:
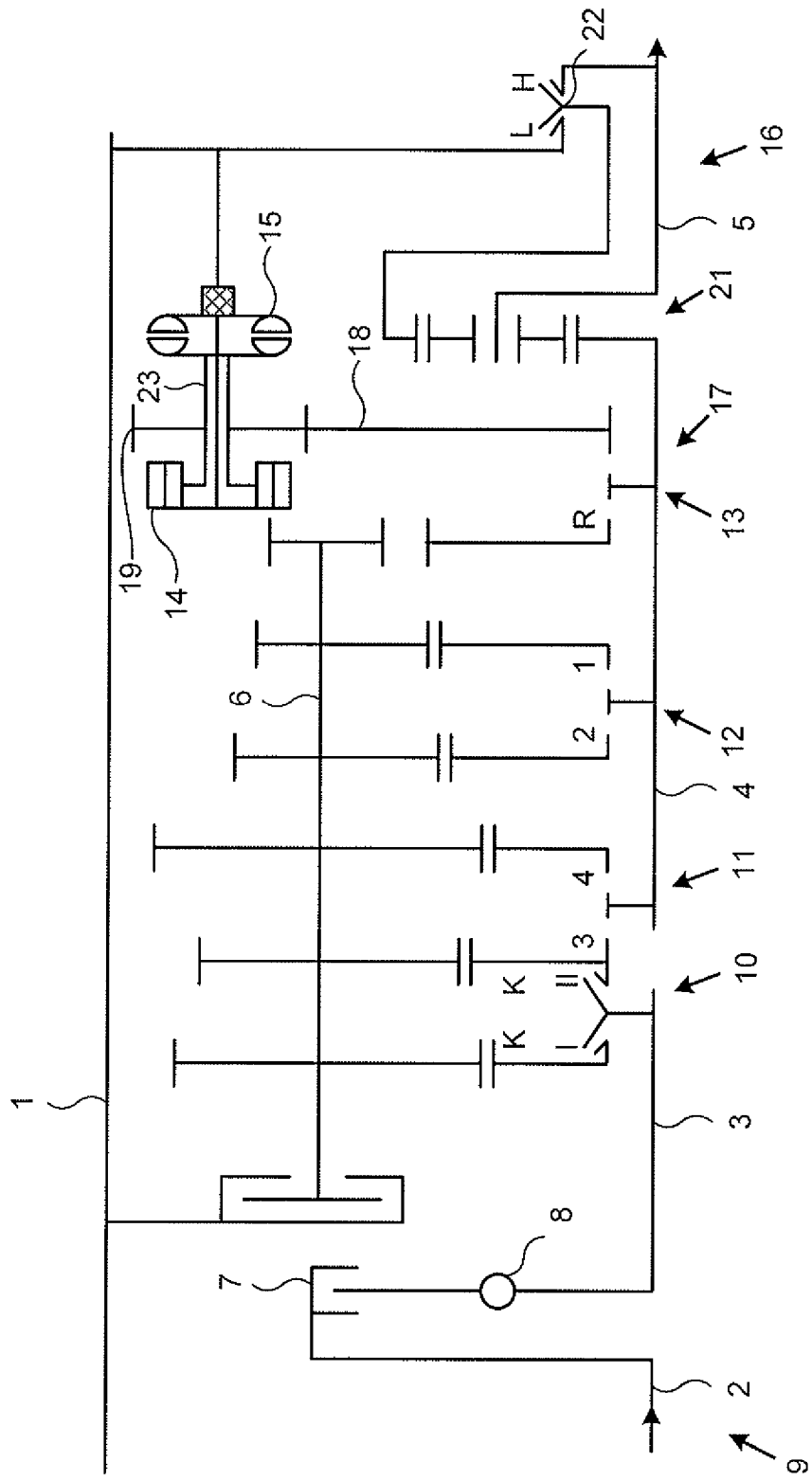
FIG. 2 is an embodiment pursuant to FIG. 1, in which the hydrodynamic retarder is arranged coaxially to the electric motor, however.

The embodiment pursuant to FIG. 2 corresponds largely to that of FIG. 1, and the same reference numbers are provided for the corresponding elements. As a deviation to FIG. 1, here, the hydrodynamic retarder 15 is positioned coaxially to the electric motor 14, however, i.e. in the shown embodiment, however not mandatory, is provided with a common shaft 23, which in addition to the pinion 19 also supports the rotor of the electric motor 14 and the rotor of the hydrodynamic retarder 15.

The invention claimed is:

1. A vehicle transmission comprising:
a transmission input;
a transmission output;
a main shaft and a countershaft that together form a plurality of transmission ratios for providing different gears, wherein the countershaft can be shifted by at least one or at least two parallel gear ratios that are optionally shiftable in drive connection with the transmission input; and
a range change transmission including at least two range-change unit transmissions that are different from one another, by means of which the main shaft can be shifted optionally into a drive connection with the transmission output;
wherein a performance interface for connecting an electric motor is provided in a direction of a propulsion power flow from the transmission input to the transmission output downstream of the countershaft and upstream of the range change transmission;
wherein on at least one of the countershaft and the main shaft, selector sleeves are provided, wherein using the selector sleeves, the transmission ratios for providing the different gears can be optionally engaged and disengaged, wherein at least the last selector sleeve of the selector sleeves viewed in the axial direction of the vehicle transmission from the transmission input to the transmission output can be shifted between at least three shift positions, wherein in a first shift position the main shaft is in a drive connection with the countershaft for developing a reverse gear, in a second shift position the at least one of the main shaft and the countershaft is in a drive connection with the electric motor, and in a third shift position the drive connection via the last selector sleeve is interrupted.

2. The vehicle transmission of claim 1, wherein the performance interface is at the same time designed to connect a hydrodynamic retarder.

3. The vehicle transmission of claim 1, wherein the performance interface is designed in the form of a shiftable clutch, in order to optionally interrupt the connection of at least one of the electric motor and a hydrodynamic retarder.

4. The vehicle transmission of claim 2, wherein the performance interface is designed in the form of a shiftable clutch, in order to optionally interrupt the connection of at least one of the electric motor and the hydrodynamic retarder.

5. The vehicle transmission of claim 2, wherein the performance interface is developed by a gear wheel that can be shifted in a drive connection with at least one of the main shaft and the countershaft, where the rotational axis of the gear wheel coincides with the rotational axis of at least one of the main shaft and the countershaft and which meshes with at least one pinion, which is in a drive connection with at least one of the electric motor and the hydrodynamic retarder and is arranged coaxial to a rotor of the at least one of the electric motor and the hydrodynamic retarder.

6. The vehicle transmission of claim 3, wherein the performance interface is developed by a gear wheel that can be shifted in a drive connection with at least one of the main shaft and the countershaft, where the rotational axis of the gear wheel coincides with the rotational axis of at least one of the main shaft and the countershaft and which meshes with at least one pinion, which is in a drive connection with at least one of the electric motor and the hydrodynamic retarder and is arranged coaxial to a rotor of the at least one of the electric motor and the hydrodynamic retarder.

7. The vehicle transmission of claim 4, wherein the performance interface is developed by a gear wheel that can be shifted in a drive connection with at least one of the main shaft and the countershaft, where the rotational axis of the gear wheel coincides with the rotational axis of at least one of the main shaft and the countershaft and which meshes with at least one pinion, which is in a drive connection with at least one of the electric motor and the hydrodynamic retarder and is arranged coaxial to a rotor of the at least one of the electric motor and the hydrodynamic retarder.

8. The vehicle transmission of claim 3, wherein a gear wheel meshes with two pinions, which are reciprocally arranged in the radial direction on opposite sides of the gear wheel, of which the first pinion is in drive connection with the electric motor, coaxial to the rotor of the electric motor, and the second pinion is in drive connection with the hydrodynamic retarder, coaxial to the rotor of the hydrodynamic retarder.

9. The vehicle transmission of claim 1, wherein the first range-change unit transmission has a transmission ratio of essentially 1 and the second range-change unit transmission has a transmission ratio often larger than 3 and essentially 4.

10. The vehicle transmission of claim 1, wherein the countershaft extends parallel to the main shaft.

11. The vehicle transmission of claim 1, wherein the transmission input is developed by a transmission input shaft that is coaxial to the main shaft and the transmission output is developed by a transmission output shaft that is coaxial to the main shaft.

12. The vehicle transmission of claim 1, wherein the range change transmission is designed in the form of a planetary transmission, comprising an internal ring gear, a sun gear and at least one planet gear supported by a planet carrier, wherein the planet carrier can be shifted, by means of a further selector sleeve, alternately between a drive connection with the internal ring gear and a stationary support, on a housing of the vehicle transmission, wherein the ring gear can be connected to at least one of the planet carrier and the housing of the vehicle transmission.

13. The vehicle transmission of claim 1, wherein during an interruption in at least one of a tractive force and an interruption of the propulsive power transmission in the vehicle transmission, the electric motor between the transmission input and the performance interface is power operated and the transmission output is driven with this via the performance interface.

14. The vehicle transmission of claim 13, wherein the transmission output is driven by means of the electric motor with a same propulsive power that existed before the interruption in the at least one of the tractive force and the interruption of the propulsive power transmission followed by an adaptation of the propulsive power transmission, with which the transmission output is driven, to a power that exists after the gearshift is completed.

* * * * *